US010214606B2

(12) United States Patent
Pirrung et al.

(10) Patent No.: US 10,214,606 B2
(45) Date of Patent: Feb. 26, 2019

(54) RANDOM COPOLYMERS AS SOIL RELEASE AGENTS IN LAUNDRY PROCESSES

(71) Applicants: BASF SE, Ludwigshafen (DE); HENKEL AG & CO. KGAA, Düsseldorf (DE)

(72) Inventors: Frank O. Pirrung, Grünstadt (DE); Huiguang Kou, Viernheim (DE); Miriam Langendörfer, Lunburgerhof (DE); Roland Ettl, Altlußheim (DE); Bernhard Ulrich Von Vacano, Mannheim (DE); Paula Barreleiro, Düsseldorf (DE); Christa Junkes, Düsseldorf (DE); Johannes Zipfel, Düsseldorf (DE); Brigitte Giesen, Düsseldorf (DE); Cornelius Bessler, Düsseldorf (DE); Martina Hutmacher, Düsseldorf (DE)

(73) Assignee: BASF SE (DE)

( * ) Notice: Subject to any disclaimer, the term of this patent is extended or adjusted under 35 U.S.C. 154(b) by 116 days.

(21) Appl. No.: 15/039,649

(22) PCT Filed: Nov. 19, 2014

(86) PCT No.: PCT/EP2014/074957
§ 371 (c)(1),
(2) Date: May 26, 2016

(87) PCT Pub. No.: WO2015/078736
PCT Pub. Date: Jun. 4, 2015

(65) Prior Publication Data
US 2017/0174803 A1 Jun. 22, 2017

(30) Foreign Application Priority Data

Nov. 27, 2013 (EP) .................................... 13194689

(51) Int. Cl.
*C08F 220/28* (2006.01)
*C08F 220/34* (2006.01)
*C08F 290/06* (2006.01)
*C11D 3/00* (2006.01)
*C11D 3/37* (2006.01)

(52) U.S. Cl.
CPC .......... *C08F 220/28* (2013.01); *C08F 220/34* (2013.01); *C08F 290/062* (2013.01); *C11D 3/0036* (2013.01); *C11D 3/3757* (2013.01); *C11D 3/3769* (2013.01); *C08F 2220/285* (2013.01)

(58) Field of Classification Search
CPC .. C08F 220/28; C08F 220/34; C08F 290/062; C08F 2220/285; C11D 3/0036; C11D 3/3757; C11D 3/3769
USPC ...................................................... 526/312
See application file for complete search history.

(56) References Cited

U.S. PATENT DOCUMENTS

| 4,170,582 | A | 10/1979 | Mori et al. |
| 5,907,055 | A | 5/1999 | Greindl et al. |
| 5,928,382 | A | 7/1999 | Reinhardt et al. |
| 5,942,152 | A | 8/1999 | Tafesh et al. |
| 5,998,645 | A | 12/1999 | Nestler |
| 6,139,769 | A | 10/2000 | Nestler |
| 6,235,695 | B1 | 5/2001 | Blum et al. |
| 6,242,405 | B1 | 6/2001 | Lykke et al. |
| 6,452,053 | B2 | 9/2002 | Fischer et al. |
| 6,476,996 | B1 | 11/2002 | Ryan |
| 6,479,450 | B1 | 11/2002 | Weiss et al. |
| 6,875,734 | B2 | 4/2005 | Reinhardt et al. |
| 7,094,745 | B2 | 8/2006 | Jonas et al. |
| 7,133,765 | B2 | 11/2006 | Beyer et al. |
| 7,160,947 | B2 | 1/2007 | Claesson et al. |
| 7,205,267 | B2 | 4/2007 | Reinhardt et al. |
| 7,335,629 | B2 | 2/2008 | Gentschev et al. |
| 7,659,354 | B2 | 2/2010 | Song et al. |
| 7,687,554 | B2 | 3/2010 | Schellenberg et al. |
| 8,318,650 | B2 | 11/2012 | Hätzelt et al. |
| 8,318,651 | B2 | 11/2012 | Hätzelt et al. |
| 8,361,951 | B2 | 1/2013 | Hätzelt et al. |
| 2001/0044401 | A1 | 11/2001 | Perkins et al. |
| 2003/0060388 | A1 | 3/2003 | Aoyagi et al. |

(Continued)

FOREIGN PATENT DOCUMENTS

| CN | 1726239 A | 1/2006 |
| DE | 19639603 A1 | 4/1998 |
| DE | 102004003710 A1 | 8/2005 |

(Continued)

OTHER PUBLICATIONS

Shovsky et al. (Formation and Stability of Water-Soluble, Molecular Polyelectrolyte Complexes: Effects of Charge Density, Mixing Ratio, and Polyelectrolyte Concentration; Langmuir 2009, 25(11), 6113-6121).*
International Search Report for PCT/EP2014/074957 dated Jan. 20, 2015.
English Translation of Chinese Office Action for Application No. 201480064632.2, dated May 2, 2017.
Iruthayaraj, J., et al., "Viscoelastic Properties of Adsorbed Bottle-brush Polymer Layers Studied by Quartz Crystal Microbalance—Dissipation Measurements", J. Phys. Chem., 2008, vol. 112, pp. 15028-15036.

*Primary Examiner* — Ling Siu Choi
*Assistant Examiner* — Ronald Grinsted
(74) *Attorney, Agent, or Firm* — Drinker Biddle & Reath LLP

(57) ABSTRACT

The present invention relates to random copolymers obtainable by polymerization, the use of said random copolymers as soil release agents in laundry processes. Further aspects of the invention are a method for easier releasing soil from textiles in laundry processes and detergents containing said random copolymers.

7 Claims, No Drawings

(56) References Cited

U.S. PATENT DOCUMENTS

| | | |
|---|---|---|
| 2009/0234062 A1 | 9/2009 | Kok et al. |
| 2016/0032224 A1 | 2/2016 | Kou et al. |

FOREIGN PATENT DOCUMENTS

| | | |
|---|---|---|
| DE | 102007017654 A1 | 10/2008 |
| DE | 102007017656 A1 | 10/2008 |
| DE | 102007017657 A1 | 10/2008 |
| EP | 0458397 A2 | 11/1991 |
| EP | 0761809 A2 | 3/1997 |
| EP | 0783035 A2 | 7/1997 |
| EP | 0805794 A1 | 11/1997 |
| EP | 832969 A2 | 4/1998 |
| EP | 0869171 A2 | 10/1998 |
| EP | 0877078 A2 | 11/1998 |
| EP | 0900264 A1 | 3/1999 |
| EP | 0909809 A2 | 4/1999 |
| EP | 0912690 A1 | 5/1999 |
| EP | 0918840 A1 | 6/1999 |
| EP | 0923635 A2 | 6/1999 |
| EP | 0 955 791 A1 | 11/1999 |
| EP | 1001009 A1 | 5/2000 |
| EP | 1038946 A2 | 9/2000 |
| EP | 1083730 A2 | 3/2001 |
| EP | 1148117 A1 | 10/2001 |
| EP | 1174491 A2 | 1/2002 |
| EP | 1194514 A1 | 4/2002 |
| EP | 1383857 A2 | 1/2004 |
| EP | 1445305 A1 | 8/2004 |
| EP | 1520910 A1 | 4/2005 |
| EP | 1911778 A1 | 4/2008 |
| JP | H07-118480 A | 5/1995 |
| JP | 2003-080838 A | 3/2003 |
| JP | 2003306888 | * 10/2003 ............ D21H 19/24 |
| JP | 2004155896 A | 6/2004 |
| JP | 2006-193732 A | 7/2006 |
| WO | WO-9606154 A1 | 2/1996 |
| WO | WO-9622964 A1 | 8/1996 |
| WO | WO-9707192 A1 | 2/1997 |
| WO | WO-9741199 A1 | 11/1997 |
| WO | WO-9744430 A1 | 11/1997 |
| WO | WO-9803625 A2 | 1/1998 |
| WO | WO-9803626 A1 | 1/1998 |
| WO | WO-9933947 A1 | 7/1999 |
| WO | WO-9965905 A1 | 12/1999 |
| WO | WO-0020471 A1 | 4/2000 |
| WO | WO-0032731 A1 | 6/2000 |
| WO | WO-0060045 A1 | 10/2000 |
| WO | WO-0105925 A1 | 1/2001 |
| WO | WO-0164826 A2 | 9/2001 |
| WO | WO-0185717 A1 | 11/2001 |
| WO | WO-0202865 A2 | 1/2002 |
| WO | WO-0248301 A1 | 6/2002 |
| WO | WO-02077145 A1 | 10/2002 |
| WO | WO-02088289 A2 | 11/2002 |
| WO | WO-03054128 A1 | 7/2003 |
| WO | WO-04/005688 A1 | 1/2004 |
| WO | WO-04/007657 A1 | 1/2004 |
| WO | WO-04/056888 A1 | 7/2004 |
| WO | WO-2004055075 A1 | 7/2004 |

* cited by examiner

RANDOM COPOLYMERS AS SOIL RELEASE AGENTS IN LAUNDRY PROCESSES

CROSS-REFERENCE TO RELATED APPLICATIONS

This application is a national stage application (under 35 U.S.C. § 371) of PCT/EP2014/074957, filed Nov. 19, 2014, which claims benefit of European Application No. 13194689.9, filed Nov. 27, 2013, both of which are incorporated herein by reference in their entirety.

The present invention relates to random copolymers obtainable by polymerization, the use of said random copolymers as soil release agents in laundry processes. Further aspects of the invention are a method for easier releasing soil from textiles in laundry processes and detergents containing said random copolymers.

In customary household washing methods, the problem exists that some types of soil and dirt are difficult to remove from textiles when using suboptimal detergent formulations and/or low wash temperatures, because these soils and dirt are strongly attached to the fiber surface or are strongly absorbed inside the fibers.

The use of several agents as soil release agents in laundry processes is known. Examples are carboxymethyl cellulose or anionic derivatives of polymers from terephthalic acid and polyethylene glycol (see e.g. E. Smulders in "Laundry Detergents" Wiley-VCH Verlag GmbH, 2002, page 88). Regarding soil release agents it is often assumed that these are deposited and accumulated on the fiber surface during laundry washing, thereby modifying the surface properties of the fibers. Soil and dirt that is subsequently deposited onto this modified fiber surface is easier released in a subsequent washing cycle.

EP 0 955 791 A1 discloses that hydrophobically modified polycarboxylate polymers are useful for promoting soil release from fabrics by contacting the fabrics with compositions comprising these polymers.

WO 2004/055075 A1 discloses a graft copolymer having a number average molecular weight of at least 10,000 comprising backbone units derived from an ethylenically unsaturated monomer, hydrophilic uncharged side chains and cationically chargeable or charged side chains containing a tertiary or quaternary nitrogen atom. These graft copolymers are used in a laundry detergent composition to promote the release of soil from textile fabrics during laundering.

The objective of the present invention is to provide random copolymers with improved properties for use as soil release agents in laundry processes. A further object is to provide liquid and powder detergent compositions suitable for that use.

It has now been found, surprisingly, that the mentioned objectives can be met to a great extent by a random copolymer obtainable by polymerization of at least one monomer according to formula (I):

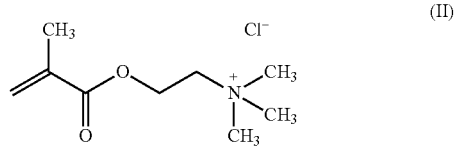

in an amount of 1 to 70 mole %, wherein n is ≥3
and
at least one monomer according to formula (II):

$$\text{(II)}$$

in an amount of 30 to 99 mole %,

In a preferred embodiment, n of the monomer according to formula (I) is between 3 and 120, preferably between 5 and 50 and even more preferably between 7 and 46.

In another preferred embodiment, n of the monomer according to formula (I) is selected from the group consisting of 7, 23 and 46.

In a further preferred embodiment, the monomer according to formula (I) is present in the amount of 5 to 70 mole % and the monomer according to formula (II) is present in the amount of 30 to 95 mole %. In a more preferred embodiment, the monomer according to formula (I) is present in the amount of 9 to 70 mole % and the monomer according to formula (II) is present in the amount of 30 to 91 mole %. In an even more preferred embodiment, the monomer according to formula (I) is present in the amount of 9 to 67 mole % and the monomer according to formula (II) is present in the amount of 33 to 91 mole %. In another preferred embodiment, the monomer according to formula (I) is present in the amount of 5 to 60 mole % and the monomer according to formula (II) is present in the amount of 40 to 95 mole %. In a further preferred embodiment, the monomer according to formula (I) is present in the amount of 5 to 50 mole % and the monomer according to formula (II) is present in the amount of 50 to 95 mole %.

The copolymer of the present invention can be produced by polymerization. More precisely, the copolymer of the present invention can be prepared by using known polymerization methods as described, for example, in the Examples below or in U.S. Pat. No. 4,170,582, US 2009/0234062 or U.S. Pat. No. 7,687,554, as exemplified for emulsion and miniemulsion polymerizations, but without use of surfactants.

A suitable process for preparing a copolymer of the present invention comprises mixing the monomers according to formula (I) and (II) and an initiator; or mixing the monomers according to formula (I) and (II), water and an initiator to establish a premix; or mixing the monomers according to formula (I) and (II), or mixing the monomers according to formula (I) and (II) and water to establish a separate premix and independently a premix from the initiator and a suitable solvent. In a second step, the premix is added to water, wherein the monomers are polymerized to obtain the polymer. The polymerization time depends on the temperature and the desired final product properties but is preferably within the range of from 0.5 to 10 hours at temperatures at a range from 25° C. and 100° C., more preferably between 50° C. and 90° C.

As radical polymerization initiators, the usual free radical initiators can be used. Preferably the free radical initiator is a bis-azo compound, a persulfate, a peroxide or a hydroperoxide, or a redox initiator.

Specific preferred radical sources are 2,2'-azobisisobutyronitrile, 2,2'-azobis(2-methyl-butyronitrile), 2,2'-azobis(2,4-dimethylvaleronitrile), 2,2'-azobis[2(2-imidazolin-2-yl)

propane]dihydrochloride, 2,2'-azobis(4-methoxy-2,4-dimethylvaleronitrile), 1,1'-azobis(1-cyclohexanecarbonitrile), 2,2'-azobis(isobutyramide) dihydrate, 2-phenylazo-2,4-dimethyl-4-methoxyvaleronitrile, dimethyl-2,2'-azobisisobutyrate, 2-(carbamoylazo)isobutyronitrile, 2,2'-azobis(2,4,4-trimethylpentane), 2,2'-azobis(2-methylpropane), 2,2'-azobis(N,N'-dimethylene-isobutyramidine), free base or hydrochloride, 2,2'-azobis(2-amidinopropane), free base or hydrochloride, 2,2'-azobis{2-methyl-N-[1,1-bis(hydroxymethyl)ethyl]propionamide} or 2,2'-azobis-{2-methyl-N-[1,1-bis(hydroxymethyl)-2-hydroxyethyl]propionamide; acetyl cyclohexane sulphonyl peroxide, diisopropyl peroxy dicarbonate, t-amyl perneodecanoate, t-butyl perneodecanoate, t-butyl perpivalate, t-amylperpivalate, bis(2,4-dichlorobenzoyl)peroxide, diisononanoyl peroxide, didecanoyl peroxide, dioctanoyl peroxide, dilauroyl peroxide, bis (2-methylbenzoyl)peroxide, disuccinic acid peroxide, diacetyl peroxide, dibenzoyl peroxide, t-butyl per 2-ethyihexanoate, bis-(4-chlorobenzoyl)-peroxide, t-butyl perisobutyrate, t-butyl permaleinate, 1,1-bis(t-butylperoxy)3,5,5-trimethylcyclohexane, 1,1-bis(t-butylperoxy)cyclohexane, t-butyl peroxy isopropyl carbonate, t-butyl perisononaoate, 2,5-dimethylhexane 2,5-dibenzoate, t-butyl peracetate, t-amyl perbenzoate, t-butyl perbenzoate, 2,2-bis (t-butylperoxy) butane, 2,2 bis (t-butylperoxy)propane, dicumyl peroxide, 2,5-dimethylhexane-2,5-di-t-butylperoxide, 3-t-butylperoxy 3-phenylphthalide, di-t-amyl peroxide, 3,5-bis (t-butylperoxy)3,5-dimethyl 1,2-dioxolane, di-t-butyl peroxide, 2,5-dimethylhexyne-2,5-di-t-butylperoxide, 3,3,6,6,9,9-hexamethyl 1,2,4,5-tetraoxa cyclononane, p-menthane hydroperoxide, pinane hydroperoxide, cumene hydroperoxide, t-butyl hydroperoxide, hydrogen peroxide, potassium persulfate, sodium persulfate or ammonium persulfate.

Preferred examples for oil-soluble and water soluble initiators are azobisisobutyro nitrile, 2,2'-azobis[2(2-imidazolin-2-yl)propane]dihydrochloride, potassium persulfate, sodium persulfate, ammonium persulfate, tert-butyl peroxymaleic acid, succinic acid peroxide, and tert-butyl hydroperoxide, benzoylperoxide, di-tert-butylperoxide, hydrogen peroxide, tert-butylperoxybenzoate and tert-butylperoxy-2-ethyl-hexanoate.

The radical generation can be facilitated by a redox system like using ascorbic acid or hydroxymethylsulfinates in combination with some of the initiators above.

The suitable amount of polymerization initiator is from 0.01 to about 5% by weight on the basis of the total amount of the monomers used.

A further aspect of the present invention is the use of a random copolymer according to the present invention as soil release agent in aqueous laundry processes.

Typically the aqueous laundry process is a domestic laundry process. For example the textile subjected to such a laundry process may be made from polyester, polyacrylate, cotton, wool, polyamide or mixtures thereof; preferably it is made from cotton.

One other aspect of the present invention is a method for soil release from textiles during an aqueous laundry process, which method comprises the step of adding a random copolymer according to invention in an effective amount to a detergent in an aqueous laundry process.

The term "effective amount" means an amount of a random copolymer according to invention that is sufficient to release the soil from textiles in aqueuos laundry processes. Preferably, the random copolymer is used as part of a detergent it preferably is present in an amount of from 0.01% by weight to 5% by weight, based on the weight of the total detergent composition.

Another aspect of the present invention is a detergent comprising a random copolymer according to the present invention.

When the random copolymer is used as part of a detergent it preferably is present in an amount of from 0.01% by weight to 5% by weight, based on the weight of the total detergent composition.

Also an aspect of the invention is a detergent comprising the random copolymer according to the invention in an amount of from 0.01% by weight to 5% by weight, preferably from 0.1% by weight to 2% by weight, based on the weight of the total detergent composition.

The detergent according to the invention can be, for example, a bleach-containing heavy-duty detergent, a detergent for delicate textiles, or a detergent for colored goods. It can be solid, such as a powder, granulate, or tablet, or liquid, such as a structured (i.e. turbid) or unstructured (i.e. clear) liquid detergent based on water and/or one or more of organic solvents.

The detergent will normally include at least one surfactant which may be anionic, cationic, nonionic or amphoteric.

The anionic surfactant can be, for example, a sulfate, sulfonate or carboxylate surfactant or a mixture thereof. Preference is given to alkylbenzenesulfonates, alkyl sulfates, alkyl ether sulfates, olefin sulfonates, fatty acid salts, alkyl and alkenyl ether carboxylates or to an a-sulfonic fatty acid salt or an ester thereof.

Preferred sulfonates are, for example, alkylbenzenesulfonates having from 10 to 20 carbon atoms in the alkyl radical, alkyl sulfates having from 8 to 18 carbon atoms in the alkyl radical, alkyl ether sulfates having from 8 to 18 carbon atoms in the alkyl radical, and fatty acid salts derived from palm oil or tallow and having from 8 to 18 carbon atoms in the alkyl moiety. The average molar number of ethylene oxide units added to the alkyl ether sulfates is from 1 to 20, preferably from 1 to 10. The cation in the anionic surfactants is preferably an alkaline metal cation, especially sodium or potassium, more especially sodium. Preferred carboxylates are alkali metal sarcosinates of formula $R_{19'}$—$CON(R_{20'})CH_2COOM_1$ wherein $R_{19'}$ is $C_9$-$C_{17}$alkyl or $C_9$-$C_{17}$alkenyl, $R_{20'}$ is $C_1$-$C_4$alkyl and $M_1$ is an alkali metal, especially sodium.

The non-ionic surfactant may be, for example, a primary or secondary alcohol ethoxylate, especially a $C_8$-$C_{20}$ aliphatic alcohol ethoxylated with an average of from 1 to 20 mol of ethylene oxide per alcohol group. Preference is given to primary and secondary $C_{10}$-$C_{15}$ aliphatic alcohols ethoxylated with an average of from 1 to 10 mol of ethylene oxide per alcohol group. Non-ethoxylated non-ionic surfactants, for example alkylpolyglycosides, glycerol monoethers and polyhydroxyamides (glucamide), may likewise be used.

In addition to or instead of anionic and/or non-ionic surfactants the composition may contain cationic surfactants. Possible cationic surfactants include all common cationic surface-active compounds, especially surfactants having a textile softening effect.

Non-limiting examples of cationic surfactants are given in the formulas below:

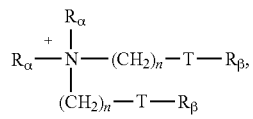

-continued

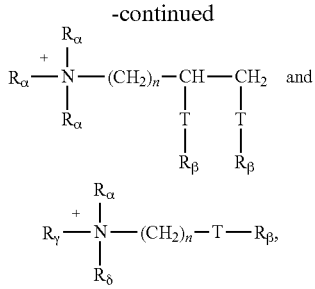

wherein
each radical $R_\alpha$ is independent of the others $C_{1-6}$-alkyl-, -alkenyl- or -hydroxyalkyl;
each radical $R_\beta$ is independent of the others $C_{8-28}$-alkyl- or alkenyl;
$R_\gamma$ is $R_\alpha$ or $(CH_2)_n$-T-$R_\beta$;
$R_\delta$ is $R_\alpha$ or $R_\beta$ or $(CH_2)_n$-T-$R_\beta$;
T=—$CH_2$—, —O—CO— or —CO—O— and n is between 0 and 5.

Preferred cationic surfactants include hydroxyalkyl-trialkyl-ammonium-compounds, especially $C_{12-18}$alkyl(hydroxyethyl)dimethylammonium compounds, and especially preferred the corresponding chloride salts.

Detergents of the present invention may contain up to 15 wt-%, for example between 0.5 wt-% and 15 wt-% of the cationic surfactant, based on the total weight of the composition.

The total amount of surfactants is preferably from 1 to 50 wt-%, especially from 1 to 40 wt-% and more especially from 1 to 30 wt-% of the detergent.

As builder substance there come into consideration, for example, alkali metal phosphates, especially tripolyphosphates, carbonates and hydrogen carbonates, especially their sodium salts, silicates, aluminum silicates, polycarboxylates, polycarboxylic acids, organic phosphonates, aminoalkylenepoly(alkylenephosphonates) and mixtures of such compounds.

Silicates that are especially suitable are sodium salts of crystalline layered silicates of the formula $NaHSi_tO_{2t+1} \cdot pH_2O$ or $Na_2Si_tO_{2t+1} \cdot pH_2O$ wherein t is a number from 1.9 to 4 and p is a number from 0 to 20.

Among the aluminum silicates, preference is given to those commercially available under the names zeolite A, B, X and HS, and also to mixtures comprising two or more of such components. Special preference is given to zeolite A.

Among the polycarboxylates, preference is given to polyhydroxycarboxylates, especially citrates, and acrylates, and also to copolymers thereof with maleic anhydride. Preferred polycarboxylic acids are nitrilotriacetic acid, ethylenediaminetetraacetic acid and ethylenediamine disuccinate either in racemic form or in the enantiomerically pure (S,S) form.

Phosphonates or aminoalkylenepoly(alkylenephosphonates) that are especially suitable are alkali metal salts of 1-hydroxyethane-1,1-diphosphonic acid, nitrilotris(methylenephosphonic acid), ethylenediaminetetramethylenephosphonic acid and diethylenetriaminepentamethylenephosphonic acid, and also salts thereof. Also preferred polyphosphonates have the following formula

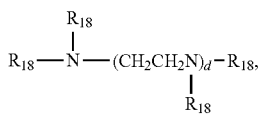

wherein
$R_{18}$ is $CH_2PO_3H_2$ or a water soluble salt thereof and
d is an integer of the value 0, 1, 2 or 3.

Especially preferred are the polyphosphonates wherein b is an integer of the value of 1.

As bleach component, which preferably is a peroxide bleach, there come into consideration hydrogen peroxide and compounds capable of yielding hydrogen peroxide in aqueous solutions, for example, the organic and inorganic peroxides known in the literature and available commercially that may bleach textile materials at conventional washing temperatures, for example at a temperature in the range of from 10 to 95° C. Preferably, however, inorganic peroxides are used, for example persulfates, perborates, percarbonates and/or persilicates.

Peroxide bleach compounds may be utilized alone or in conjunction with a peroxyacid bleach precursor and/or a bleach catalyst. Peroxy acids precursers are often referred to as bleach activators. Suitable bleach activators include the bleach activators, that carry O- and/or N-acyl groups and/or unsubstituted or substituted benzoyl groups. Preference is given to polyacylated alkylenediamines, especially tetraacetylethylenediamine (TAED); acylated glycolurils, especially tetraacetyl glycol urea (TAGU), N,N-diacetyl-N,N-dimethylurea (DDU); sodium-4-benzoyloxy benzene sulphonate (SBOBS); sodium-1-methyl-2-benzoyloxy benzene-4-sulphonate; sodium-4-methyl-3-benzoloxy benzoate; trimethyl ammonium toluyloxy-benzene sulphonate; acylated triazine derivatives, especially 1,5-diacetyl-2,4-dioxohexahydro-1,3,5-triazine (DADHT); compounds of formula (6):

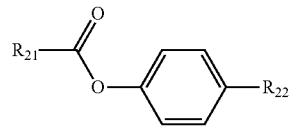

(10)

wherein $R_{22}$ is a sulfonate group, a carboxylic acid group or a carboxylate group, and wherein $R_{21}$ is linear or branched $(C_7-C_{15})$alkyl, especially activators known under the names SNOBS, SLOBS and DOBA; nitrile compounds that form perimine acids with peroxides also come into consideration as bleach activators. These bleach activators may be used in an amount of up to 12 wt-%, preferably from 2-10 wt-% based on the total weight of the composition.

It is also possible to use bleach catalysts, which are commonly known, for example transition metal complexes as disclosed in EP 1194514, EP 1383857 or WO04/007657.

Further bleach catalysts are disclosed in: US 2001044401, EP 0458397, WO 9606154, EP 1038946, EP 0900264, EP 0909809, EP 1001009, WO 9965905, WO 0248301, WO 0060045, WO 02077145, WO 0185717, WO 0164826, EP 0923635, DE 19639603, DE102007017654, DE102007017657, DE102007017656, US 20030060388, EP 0918840B1, EP 1174491A2, EP 0805794B1, WO 9707192A1, U.S. Pat. No. 6,235,695B1, EP 0912690B1, EP 832969B1, U.S. Pat. No. 6,479,450B1, WO 9933947A1, WO 0032731A1, WO 03054128A1, DE102004003710, EP 1083730, EP 1148117, EP 1445305, U.S. Pat. No. 6,476,996, EP 0877078, EP 0869171, EP 0783035, EP 0761809 and EP 1520910. If desired a bleach catalyst may be combined with a peroxyacid bleach precursor.

The detergent may comprise one or more optical brighteners, for example from the classes bis-triazinylaminostilbenedisulfonic acid, bis-triazolyl-stilbenedisulfonic acid, bis-styryl-biphenyl or bis-benzofuranylbiphenyl, α bis-benzoxalyl derivative, bis-benzimidazolyl derivative or coumarin derivative or a pyrazoline derivative.

The compositions may furthermore comprise one or more further additives. Such additives are, for example, dirt-suspending agents, for example sodium carboxymethylcellulose; pH regulators, for example alkali metal or alkaline earth metal silicates; foam regulators, for example soap; salts for adjusting the spray drying and the granulating properties, for example sodium sulfate; perfumes; and also, if appropriate, antistatics and softening agents such as, for example, smectite; pigments; and/or toning agents. These constituents should especially be stable to any bleaching agent, if such is employed.

If such auxiliaries are used they normally are added in a total amount of from 0.1-20 wt-%, preferably from 0.5-10 wt-%, especially from 0.5-5 wt-%, based on the total weight of the detergent.

Furthermore, the detergent may optionally also comprise enzymes. Enzymes can be added for the purpose of stain removal. The enzymes usually improve the action on stains caused by protein or starch, such as, for example, blood, milk, grass or fruit juices. Preferred enzymes are cellulases and proteases, especially proteases. Cellulases are enzymes that react with cellulose and its derivatives and hydrolyse them to form glucose, cellobiose and cellooligosaccharides. Cellulases remove dirt and, in addition, have the effect of enhancing the soft handle of the fabric.

Examples of customary enzymes include, but are by no means limited to, the following:

proteases as described in U.S. Pat. No. 6,242,405, column 14, lines 21 to 32;

lipases as described in U.S. Pat. No. 6,242,405, column 14, lines 33 to 46;

amylases as described in U.S. Pat. No. 6,242,405, column 14, lines 47 to 56; and cellulases as described in U.S. Pat. No. 6,242,405, column 14, lines 57 to 64;

Commercially available detergent proteases, such as Alcalase®, Esperase®, Everlase®, Savinase®, Kannase® and Durazym®, sold e.g. by NOVOZYMES A/S;

Commercially available detergent amylases, such as Termamyl®, Duramyl®, Stainzyme®, Natalase®, Ban® and Fungamyl®, sold e.g. by NOVOZYMES A/S;

Commercially available detergent ellulases, such as Celluzyme®, Carezyme® and Endolase®, sold e.g. by NOVOZYMES A/S;

Commercially available detergent lipases, such as Lipolase®, Lipolase Ultra® and Lipoprime®, sold e.g. by NOVOZYMES A/S;

Suitable mannanases, such as Mannanaway, sold by NOVOZYMES A/S.

The enzymes, when used, may be present in a total amount of from 0.01 to 5 wt-%, especially from 0.05 to 5 wt-% and more especially from 0.1 to 4 wt-%, based on the total weight of the detergent.

Further preferred ingredients in a detergent according to the invention are dye-fixing agents and/or polymers which, during the washing of textiles, prevent staining caused by dyes in the washing liquor that have been released from the textiles under the washing conditions. Such polymers are preferably polyvinylpyrrolidones, polyvinylimidazoles or polyvinylpyridine-N-oxides, which may have been modified by the incorporation of anionic or cationic substituents, especially those having a molecular weight in the range of from 5000 to 60 000, more especially from 10 000 to 50 000.

If such polymers are used, they are usually used in a total amount of from 0.01 to 5 wt-%, especially from 0.05 to 5 wt-%, more especially from 0.1 to 2 wt-%, based on the total weight of the detergent formulation. Preferred polymers are those mentioned in WO-A-02/02865 (see especially page 1, last paragraph and page 2, first paragraph) and those in WO-A-04/05688.

It is also possible to employ a random copolymer according to the invention in combination with a conventional soil-release polymer obtainable from dicarboxylic acid and optionally polymeric diol, in order to further enhance the cleaning power of laundry detergents when washing fabrics. In the context of a detergent according to the invention, such combinations are also possible. The known polyester soil-release polymers that can be additionally incorporated or used include copolyesters of dicarboxylic acids, for example adipic acid, phthalic acid, terephthalic acid or sulfoisophthalic acid, with diols, for example ethylene glycol or propylene glycol, and optionally polydiols, for example polyethylene glycol or polypropylene glycol.

The detergent according to the invention may also optionally contain one or more heavy metal chelating agents, such as hydroxyethyldiphosphonate (HEDP). More generally, chelating agents suitable for use herein can be selected from the group consisting of amino carboxylates, amino phosphonates, polyfunctionally-substituted aromatic chelating agents and mixtures thereof. Other suitable chelating agents for use herein are the commercial DEQUEST series, and chelants from Nalco, Inc. Aminocarboxylates useful as optional chelating agents include ethylenediaminetetracetates, N-hydroxyethylethylenediaminetriacetates, nitrilotriacetates, ethylenediamine tetraprorionates, triethylenetetraaminehexacetates, diethylenetriamine-pentaacetates, and ethanoldiglycines, alkali metal, ammonium, and substituted ammonium salts thereof and mixtures thereof. Aminophosphonates are also suitable for use as chelating agents in the compositions of the invention when at least low levels of total phosphorus are permitted in detergent compositions, and include ethylenediaminetetrakis (methylenephosphonates). Further biodegradable sequestrants are, for example, aminoacid acetates, such as Trilon M (BASF) and Dissolvine GL (AKZO), as well as asparaginic acid derivatives, such as Baypure CX. Preferably, the aminophosphonates do not contain alkyl or alkenyl groups with more than about 6 carbon atoms. A highly preferred biodegradable chelator for use herein is ethylenediamine disuccinate ("EDDS"). If utilized, such chelating agents or transition-metal selective sequestrants will generally comprise from about 0.001 wt-% to about 10 wt-%, more preferably from about 0.05 wt-% to about 1 wt-% of the laundry detergent compositions herein.

A preferred detergent according to the invention may additionally contain a dispersant polymer. When present, a dispersant polymer is typically at levels in the range from 0 wt-% to about 25 wt-%, preferably from about 0.5 wt-% to about 20 wt-%, more preferably from about 1 wt-% to about 8 wt-% of the detergent.

Suitable polymers are preferably at least partially neutralized or alkali metal, ammonium or substituted ammonium (e.g., mono-, di- or triethanolammonium) salts of polycarboxylic acids. The alkali metal, especially sodium salts are most preferred. While the molecular weight of the polymer can vary over a wide range, it preferably is from about 1,000 to about 500,000, more preferably is from about 1,000 to about 250,000.

Unsaturated monomeric acids that can be polymerized to form suitable dispersant polymers include acrylic acid, maleic acid (or maleic anhydride), fumaric acid, itaconic acid, aconitic acid, mesaconic acid, citraconic acid and methylenemalonic acid. The presence of monomeric segments containing no carboxylate radicals such as methyl vinyl ether, styrene, ethylene, etc. is suitable provided that such segments do not constitute more than about 50 wt-% of the dispersant polymer.

Copolymers of acrylamide and acrylate having a molecular weight of from about 3,000 to about 100,000, preferably from about 4,000 to about 20,000, and an acrylamide content of less than about 50 wt-%, preferably less than about 20 wt-% of the dispersant polymer can also be used. Most preferably, such dispersant polymer has a molecular weight of from about 4,000 to about 20,000 and an acrylamide content of from about 0 wt-% to about 15 wt-%, based on the total weight of the polymer.

Particularly preferred dispersant polymers are low molecular weight modified polyacrylate copolymers. Such copolymers contain as monomer units: a) from about 90 wt-% to about 10 wt-%, preferably from about 80 wt-% to about 20 wt-% acrylic acid or its salts and b) from about 10 wt-% to about 90 wt-%, preferably from about 20 wt-% to about 80 wt-% of a substituted acrylic monomer or its salt and have the general formula:

—[(C(R$_a$)C(R$_b$)(C(O)OR$_c$)]— wherein the apparently unfilled valencies are in fact occupied by hydrogen and at least one of the substituents R$_a$, R$_b$, or R$_c$, preferably R$_a'$ or R$_b'$, is a 1 to 4 carbon alkyl or hydroxyalkyl group; R$_a'$ or R$_b'$ can be a hydrogen and R$_c'$ can be a hydrogen or alkali metal salt. Most preferred is a substituted acrylic monomer wherein R$_a'$ is methyl, R$_b'$ is hydrogen, and R$_c'$ is sodium.

A suitable low molecular weight polyacrylate dispersant polymer preferably has a molecular weight of less than about 15,000, preferably from about 500 to about 10,000, most preferably from about 1,000 to about 5,000. The most preferred polyacrylate copolymer for use herein has a molecular weight of about 3,500 and is the fully neutralized form of the polymer comprising about 70 wt-% acrylic acid and about 30 wt-% methacrylic acid.

Other dispersant polymers useful herein include the polyethylene glycols and polypropylene glycols having a molecular weight of from about 950 to about 30,000.

Yet other dispersant polymers useful herein include the cellulose sulfate esters such as cellulose acetate sulfate, cellulose sulfate, hydroxyethyl cellulose sulfate, methylcellulose sulfate, and hydroxypropylcellulose sulfate. Sodium cellulose sulfate is the most preferred polymer of this group.

Other suitable dispersant polymers are the carboxylated polysaccharides, particularly starches, celluloses and alginates.

Yet another group of acceptable dispersants are the organic dispersant polymers, such as polyaspartate.

Organic solvents that can be used in a detergent according to the invention, especially when the latter are in liquid or paste form, include alcohols having from 1 to 4 carbon atoms, especially methanol, ethanol, isopropanol and tert-butanol, diols having from 2 to 4 carbon atoms, especially ethylene glycol and propylene glycol, and mixtures thereof, and the ethers derivable from the mentioned classes of compound. Such water-miscible solvents are present in the cleaning formulations according to the invention preferably in amounts not exceeding 20 wt-%, especially in amounts of from 1 wt-% to 15 wt-%.

The detergent formulations can take a variety of physical forms such as, for example, powder granules, tablets (tabs), gel and liquid. Examples thereof include, inter alia, conventional high-performance detergent powders, supercompact high-performance detergent powders, conventional heavy duty liquid detergents, highly concentrated gels and tabs.

The detergent may also be in the form of an aqueous liquid containing from 5 wt-% to 90 wt-%, preferably from 10 wt-% to 70 wt-%, of water, or in the form of a non-aqueous liquid containing no more than 5 wt-%, preferably from 0 wt-% to 1 wt-% of water. Non-aqueous liquid detergent formulations may comprise other solvents as carriers. Low molecular weight primary or secondary alcohols, for example methanol, ethanol, propanol and isopropanol, are suitable for that purpose. The solubilising surfactant used is preferably a monohydroxy alcohol but polyols, such as those containing from 2 to 6 carbon atoms and from 2 to 6 hydroxy groups (e.g., 1,3-propanediol, ethylene glycol, glycerol and 1,2-propanediol) can also be used. Such carriers are usually used in a total amount of from 5 wt-% to 90 wt-%, preferably from 10 wt-% to 50 wt-%, based on the total weight of the detergent formulation. The detergent formulations can also be used in so-called "unit liquid dose" form.

The definitions and preferences given above apply equally for all aspects of the invention.

The following examples illustrate the invention.

Abbreviations:
GPC: gel permeation chromatography
MPEG: Methoxypolyethylene glycol, Poly(ethylene glycol)mono-methylether Reagents:
MPEG 2000MA as 50% aqueous solution
Bisomer S10W (MPEG 1000MA) as 50% aqueous solution
MPEG 350MA as water-free liquid
2-(Methacryloyloxy)ethyl]trimethylammoniumchloride as 80% aqueous solution
WAKO VA-44 (=2,2'-Azobis[2-(2-imidazolin-2-yl)propane]dihydrochloride)
AIBN (=2,2'-Azobis(2-methylpropionitrile)

Methods:
Solid content was measured at 150° C. by a Mettler Toledo HR73 Halogen dryer with samples of 0.5 g.
GPC was measured against polyethyleneglycol standards in aqueos 0.02 mol/l formic acid and 0.2 mol/l KCl solution on a SUPREMA-Gel(HEMA) column at 35° C. and 0.8 ml/min flow.
Colour numbers were determined against the Gardner scale with a LICO 150 equipment from Hach-Lange

EXAMPLE 1

Preparation of Aqueous Solutions of Random Copolymers According to the Present Invention In a 350 ml round reaction flask with overhead stirrer, cooler, thermometer and dropping funnel, 95 g of demineralized water was placed and inertized with $N_2$, followed by heating to an inside temperature of 90° C.

The monomer blend was prepared by mixing 56.25 g of MPEG 350MA (100%, 67 mole %) and 23.44 g of 2-(Methacryloyloxy)ethyl]trimethylammoniumchlorid (80% in water, 33 mole %), followed by addition of a solution of 0.45 g of WAKO VA-44 (0.6% based on monomers) in 10 g of water, and homogenized. This premix was added over a period of 3 hours to the reactor kept at 90° C. Then the contents were stirred for another 3 hours at 80-90° C. The final product was obtained as an almost colorless viscous liquid, and was filtered over a 125µ sieve.

According to analysis via $^1$H-NMR the conversion of the acrylic bonds was complete.

Data of the polymer 1 of Example 1:
Solid content 30.2%
GPC Mn=26,400 g/mol, Mw=51,200 g/mol
Colour 2.9 Gardner units In accordance to the process described in Example 1, the following samples were prepared on the same scale and are summarized in Table 1:

TABLE 1

Polymers

| Polymer | MPEG xxxxMA | Mole % MPEGMA | Mole % DMAEMA-MeCl | Wako VA-044 | Solid content | Gardner color | Mn Mw PD | Aspect |
|---|---|---|---|---|---|---|---|---|
| 1 | 350 | 67 | 33 | 0.60 | 30.2 | 2.9 | 26400 51200 1.90 | colorless slight hazy liquid |
| 2 | 1000 | 38.5 | 61.5 | 0.60 | 30.7 | 0.8 | 22200 41000 1.80 | colorless clear liquid |
| 3 | 2000 | 23.9 | 76.1 | 0.60 | 29.3 | 1.3 | 25100 44800 1.80 | colorless clear liquid |
| 4 | 2000 | 16.1 | 83.9 | 0.60 | 29.8 | 0.6 | 25600 48000 1.90 | colorless clear liquid |
| 5 | 1000 | 23.8 | 76.2 | 0.60 | 30.4 | 1.2 | 26600 51100 1.90 | colorless slight hazy liquid |
| 6 | 1000 | 23.8 | 76.2 | 1.03 | 31.1 | 1.4 | 3500 21330 6.1 | colorless clear liquid |
| 7 | 350 | 62.5 | 37.5 | 1.34 | 30.3 | 0.1 | 770 6500 8.5 | colorless clear liquid |
| 8 | 2000 | 9.4 | 90.6 | 1.12 | 30.3 | 0.6 | 42400 81930 1.9 | colorless slight hazy liquid |

COMPARATIVE EXAMPLE 1

Manufacture of Copolymer According to Example 6 of Table 2 of WO 2004/055075 A1

In a 350 ml round reaction flask with overhead stirrer, cooler, thermometer, and dropping funnel 92 g of demineralized water was placed and inertized with $N_2$, followed by heating to an inside temperature of 90° C.

The monomer blend was prepared by mixing 148.3 g of MPEG 2000MA (50% in water, 90 mole %) and 1.08 g of 2-(Methacryloyloxy)ethyl]trimethyl ammoniumchloride (80% in water, 10 mole %), followed by addition of a solution of 0.45 g of WAKO VA-44 in 10 g of water. This premix was added over a period of 3 hours to the reactor kept at 90° C. Then the contents were stirred for another 1.5 hours at 80-90° C. The final product was obtained as an almost colorless viscous liquid, and was filtered over a 125µ sieve.

Data of Comparative Example 3:
Solid content 33.0%
GPC Mn=20,600 g/mol, Mw=64,800 g/mol
Colour 0.4 Gardner units

APPLICATION EXAMPLES

EXAMPLE 2

Testing of Soil Release Effect of the Random Copolymers of the Invention in Liquid Detergents Washing machine: Miele W 918 Novotronic®
Washing temperature: 20° C.
Liquor volume: 17 l
Water hardness: 16° dH (German hardness degree)
Ballast textiles: Clean laundry (Pillow, tricot, dish towels); 3.5 kg including the test textiles
The laundry including the cotton and polyester test textiles was washed three times with a wash liquor comprising 75 ml of either detergent E1 or V1 (see composition in Table 2) according to the conditions given above. After the washing process, the laundry was air-dried.

TABLE 2

| Detergent composition [weight %]: | V1 | E1 |
|---|---|---|
| C12-14-fatty alcohol with 7 EO | 7 | 7 |
| C12-18-fatty acid, Na-salt | 10 | 10 |
| Boric acid | 4 | 4 |
| Citric acid | 2 | 2 |
| Propanediol | 6 | 6 |
| NaOH | 3 | 3 |
| Protease | 0.6 | 0.6 |
| Amylase | 0.1 | 0.1 |
| Random copolymer of Examples 1 to 8 or comparative copolymer | — | 1.5 |
| $H_2O$ | ad 100 | |

Subsequently, the test textiles were soiled with standardized fat/pigments (A: Make-up; B: Lipstick: C: sebum) and the stained textiles were kept for 7 days at room temperature. The test textiles, together with the ballast textiles, were then washed with the wash liquors comprising the same detergent V1 or E1 (again in an amount of 75 ml) under the conditions given above. The CIE brightness Y of the test textiles was measured with a DATA-COLOR Spectra Flash SF500 remission spectrometer.

In Table 3 the performance results are shown (mean value of lightness Y of 6 washing procedures). A significant increase in Y of the stained test textiles was observed when using wash liquors comprising detergents with the random copolymers of the invention (E1). Thus, detergents comprising random copolymers of the invention (E1) have a significantly increased washing performance as compared to a detergent without such polymer (V1) or the comparative random copolymer as can be derived from Table 3.

TABLE 3

Performance results of liquid detergent

| Detergent | MPEG xxxxMA | Mole % MPEGMA | Mole % DMAEMA-MeCl | Makeup on cotton | Lipstick on cotton | Sebum on cotton | Lipstick on polyester |
|---|---|---|---|---|---|---|---|
| V1 w/o polymer | — | — | — | 40.0 | 39.4 | 39.5 | 41.2 |
| E1 + comparative polymer 1 | 2000 | 90 | 10 | 41.6 | 42.3 | 39.9 | 43.1 |
| E1 + polymer 1 | 350 | 67 | 33 | 46.5 | 44.1 | 44.5 | 45.8 |
| E1 + polymer 2 | 1000 | 38.5 | 61.5 | 47.2 | 43.6 | 44.5 | 44.9 |
| E1 + polymer 3 | 2000 | 23.9 | 76.1 | 43.9 | 43.2 | 42.7 | 43.6 |
| E1 + polymer 4 | 2000 | 16.1 | 83.9 | 44.1 | 43.9 | 42.9 | 44.7 |
| E1 + polymer 5 | 1000 | 23.8 | 76.2 | 44.7 | 43.9 | 44.2 | 45.1 |
| E1 + polymer 6 | 1000 | 23.8 | 76.2 | 46.2 | 45.2 | 43.6 | 43.9 |
| E1 + polymer 7 | 350 | 62.5 | 37.5 | 47.1 | 43.5 | 45.6 | 45.2 |
| E1 + polymer 8 | 2000 | 9.4 | 90.6 | 46.1 | 44.0 | 43.5 | 45.1 |

EXAMPLE 3

Testing of Soil Release Effect of the Random Copolymers of the Invention in Powder Detergents Example 9 was repeated by substituting the detergents V1 and E1, respectively, by the powder detergents V2 and E2 (see composition in Table 4), which were used in amounts of 75 g per wash liquor.

TABLE 4

| Detergent composition [weight %]: | V2 | E2 |
|---|---|---|
| $C_{12-18}$-fatty alcohol with 7 EO | 2 | 2 |
| $C_{12-18}$-fatty alcohol sulfate with 7 EO, sodium salt | 1.5 | 1.5 |
| Linear alkylbenzol sulfonate, sodium salt | 10 | 10 |
| Sodium carbonate | 20 | 20 |
| Sodium hydrogen carbonate | 6.5 | 6.5 |
| Sodium disilicate | 4 | 4 |
| Sodium percarbonate | 17 | 17 |
| TAED | 4 | 4 |
| Polyacrylates, sodium salt | 3 | 3 |
| carboxymethylcellulose | 1 | 1 |
| Sodium phosphoante | 1 | 1 |
| Sodium sulfate | 25 | 25 |
| Mix of enzymes | 1 | 1 |
| Random copolymer of Examples 1 to 8 and comparative copolymer | — | 1.5 |

In Table 5 the performance results are shown (mean value of brightness Y of 6 washing procedures). A significant increase in Y of the stained test textiles was observed when using wash liquors comprising detergents with the random copolymers of the invention (E2). Thus, detergents comprising random copolymers of the invention (E2) have a significantly increased washing performance as compared to a detergent without such polymer (V2) or the comparative random copolymer as can be derived from Table 5.

TABLE 5

Performance results of powder detergent

| Detergent | MPEG xxxxMA | Mole % MPEGMA | Mole % DMAEMA-MeCl | Makeup on cotton | Lipstick on cotton | Sebum on cotton | Lipstick on polyester |
|---|---|---|---|---|---|---|---|
| V2 w/o polymer | — | — | — | 46.2 | 44.8 | 47.8 | 49.0 |
| E2 + comparative polymer 1 | 2000 | 90 | 10 | 47.8 | 46.8 | 48.9 | 50.9 |
| E2 + polymer 1 | 350 | 67 | 33 | 52.2 | 49.7 | 50.4 | 53.0 |
| E2 + polymer 2 | 1000 | 38.5 | 61.5 | 51.9 | 49.4 | 51.2 | 53.4 |
| E2 + polymer 3 | 2000 | 23.9 | 76.1 | 50.7 | 48.4 | 50.1 | 51.4 |
| E2 + polymer 4 | 2000 | 16.1 | 83.9 | 50.9 | 49.2 | 50.7 | 51.5 |
| E2 + polymer 5 | 1000 | 23.8 | 76.2 | 53.4 | 50.2 | 50.9 | 53.8 |
| E2 + polymer 6 | 1000 | 23.8 | 76.2 | 54.6 | 51.4 | 51.2 | 53.8 |
| E2 + polymer 7 | 350 | 62.5 | 37.5 | 52.9 | 50.5 | 50.4 | 54.1 |
| E2 + polymer 8 | 2000 | 9.4 | 90.6 | 51.4 | 49.9 | 49.6 | 52.8 |

The invention claimed is:
1. A random copolymer obtained by polymerization of
(i) at least one monomer according to formula (I):

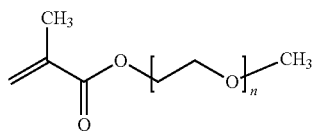
(I)

in an amount of 38.5 to 70 mol %,
wherein n is 3 to 23, and
(ii) at least one monomer according to formula (II):

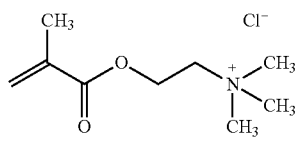
(II)

in an amount of 30 to 61.5 mol %.

2. The random copolymer according to claim 1, wherein n of the at least one monomer according to formula (I) is between 5 and 23.

3. The random copolymer according to claim 1, wherein n of the at least one monomer according to formula (I) is selected from the group consisting of 7 and 23.

4. A soil release agent in aqueous laundry processes which comprises the random copolymer as defined in claim 1.

5. A detergent comprising the random copolymer as defined in claim 1.

6. The random copolymer according to claim 1, wherein n of the at least one monomer according to formula (I) is from 3 to 23.

7. The random copolymer according to claim 1, wherein n of the at least one monomer according to formula (I) is 7.

* * * * *